July 14, 1936.   J. A. McBRADY   2,047,485
COLLAPSIBLE SHOVEL
Filed May 22, 1935
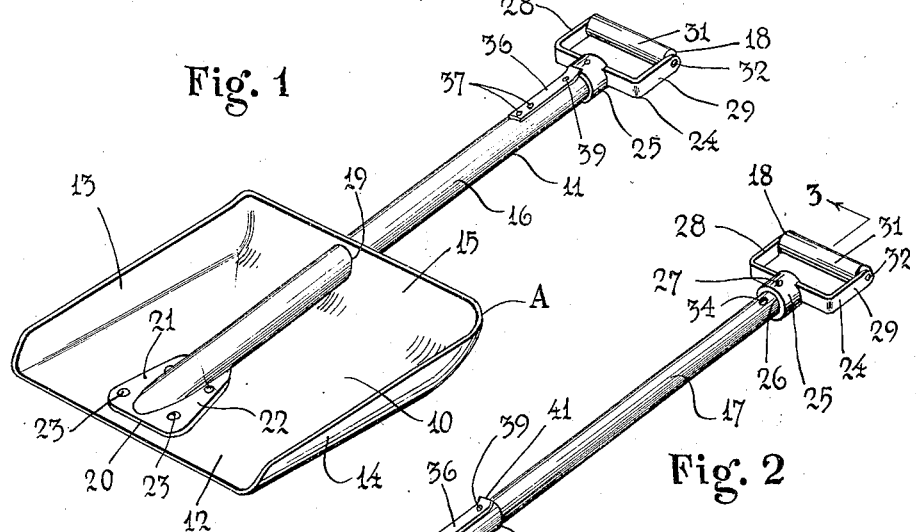
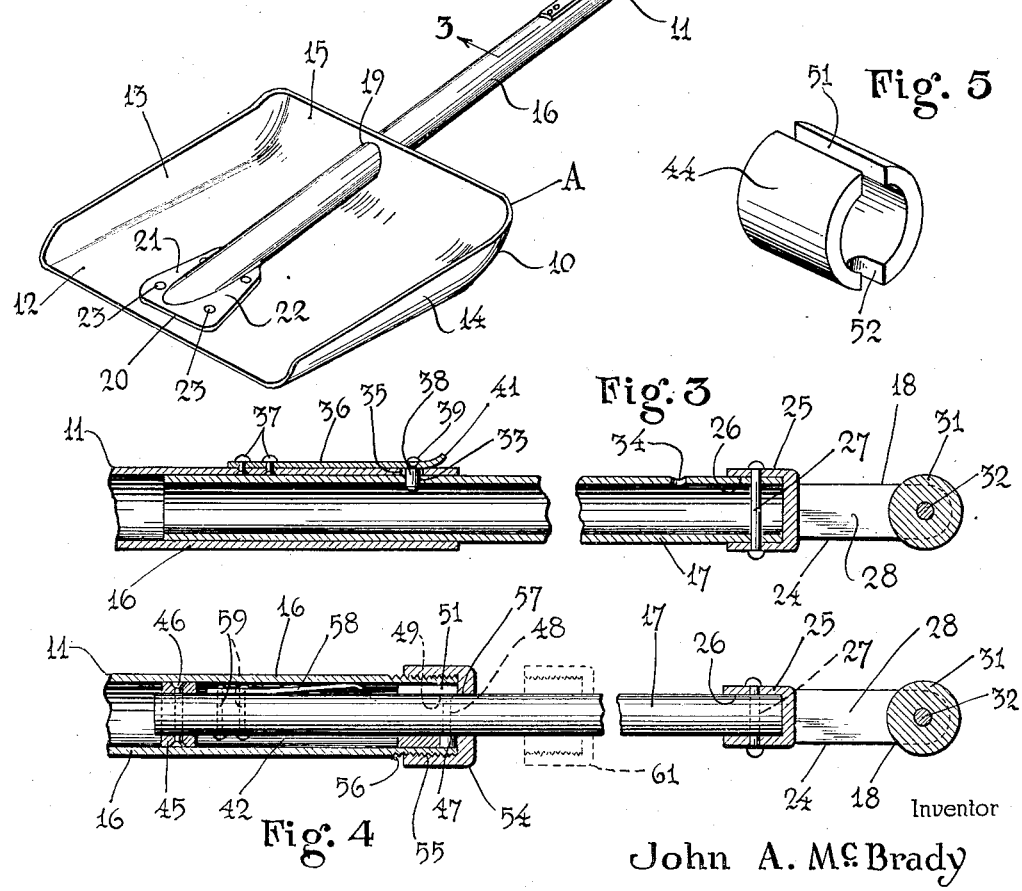
Inventor
John A. McBrady
By Caswell & Lagaard
Attorneys Patented July 14, 1936

2,047,485

UNITED STATES PATENT OFFICE 2,047,485

COLLAPSIBLE SHOVEL

John A. McBrady, Valley City, N. Dak., assignor of one-half to Ella M. Mangan, Valley City, N. Dak.

Application May 22, 1935, Serial No. 22,768

6 Claims. (Cl. 294—57)

My invention relates to implements and particularly to implements in the nature of a shovel and has for an object to provide a practical and efficient shovel which may be readily collapsed into a compact form.

Another object of the invention resides in providing an extremely practical handle for use with any type of implement, which handle may be extended or retracted as desired.

An object of the invention resides in constructing the handle with a tubular section attached to the implement and with a telescoping section slidable along the tubular section, and in providing locking means for holding the telescoping section in position with respect to the tubular section.

A feature of the invention resides in constructing the shovel with a blade having a flange extending upwardly from the rearward edge thereof and formed with an opening for the reception of the tubular section.

Another object of the invention resides in feathering the edge of the tubular section and in attaching the same to the face of the blade of the shovel.

A feature of the invention resides in slitting the end of the tubular section and in flattening the severed portions thereof to form ears projecting on either side of the tubular section, by means of which the said section may be attached to the face of the blade.

A still further object of the invention resides in constructing one of the sections with a socket and the other with a lug adapted to be received in the socket and to provide means for holding said lug within the socket to prevent both rotational and longitudinal movement of the telescoping section with respect to the tubular section.

An object of the invention resides in providing a leaf spring attached to the tubular section and having a lug thereon and in forming the tubular section with an opening therein through which said lug extends.

An object of the invention resides in constructing the telescoping section with sockets into which said lug may project to hold the parts in locked position.

A still further object of the invention resides in providing as an alternate form of the invention a sleeve within said tubular section for the reception of said telescoping section, said sleeve having a slot extending along the same and a notch at its outer edge and in forming said inner section with a lug which is adapted to slide through said slot and to be disposed on the interior of the tubular section or to be lodged within said notch.

Another object of the invention resides in providing a screw cap threaded onto the tubular section and holding said lug within the notch.

Other objects of the invention reside in the novel combination and arrangement of parts and in the details of construction hereinafter illustrated and/or described.

In the drawing:

Fig. 1 is a perspective view of a shovel illustrating an embodiment of my invention and showing the handle in retracted position.

Fig. 2 is a perspective view of the shovel shown in Fig. 1 and illustrating the handle in extended position.

Fig. 3 is a longitudinal sectional view taken on line 3—3 of Fig. 2 and drawn to a larger scale.

Fig. 4 is a view similar to Fig. 3 of a modification of the invention.

Fig. 5 is a perspective view of the sleeve used in the form of the invention shown in Fig. 4.

At times, it frequently becomes desirable to carry a shovel in an automobile. The space available in an automobile for the carrying of a shovel is, however, extremely limited and an ordinary shovel cannot be carried without considerable inconvenience. The present invention provides an extremely simple and compact shovel which may be collapsed into compact form so as to permit of the same being carried about in an automobile. The invention further provides an extremely simple and practical handle which may be applied to any desired implement.

In Figs. 1 and 2 I have shown my invention as applied to a shovel, though it can readily be comprehended that the same may be used with other implements as well. The shovel illustrated in Figs. 1 and 2 has been indicated in its entirety by the reference numeral A and consists of a blade 10 and an extensible handle 11 secured thereto. These parts will now be described in detail.

The shovel shown is one which may have universal use and is preferably constructed as light in weight and rigid as possible. The blade 10 is constructed from sheet metal pressed into the form of a scoop having a bottom or back 12, side flanges 13 and 14 and a rear flange 15 extending upwardly from the bottom 12. These parts are preferably formed integral, though the same may be constructed in any suitable manner such as is well known in the art.

The handle 11 is constructed in two sections 16 and 17. The section 16 is tubular while the section 17 may be tubular or solid, as desired, and is of suitable dimensions to be received within the section 16 and to slide relative thereto. Throughout the description of my invention, I have referred to the section 16 as a tubular section and the tubular section 17 as a telescoping section. The section 16 is attached to the blade 10 while the section 17 has secured to it a hand grip 18.

For the purpose of securing the section 16 of handle 11 to the blade 10, the rear flange 15 of said blade is constructed with a circular opening 19 of suitable diameter to receive the said tubular section 16. The extreme forward end of the tubular section 16 is feathered as indicated at 20. This is accomplished by slitting the tube longitudinally and by separating the slit portion and flattening the same out to form two ears 21 and 22 extending laterally on opposite sides of said tubular section and disposed in a plane oblique with respect to the axis of said tubular section. These two ears 21 and 22 overlie the face of the bottom 12 of blade 10 and are directly secured thereto by means of rivets 23. If desired, however, the said parts may be welded together instead of riveted.

The hand grip 18 consists of a yoke 24 which is provided with a boss 25 having a bore 26 extending into the end of the same. The end of the section 17 of handle 11 extends into the bore 26 and the said yoke is held attached to the end of the section 17 by means of a rivet 27 which passes jointly through the boss 25, and said section. Yoke 24 is formed with spaced arms 28 and 29. A hand piece 31 is disposed between said arms and is held secured thereto by means of a rivet 32 extending jointly through said arms and hand piece.

For the purpose of holding the telescoping section 17 in retracted or extended position with respect to the section 16, section 17 is constructed with two sockets 33 and 34 which are disposed near the ends of said section respectively. These sockets may be formed by drilling holes into the section which when the section is constructed of tubular material as shown in Fig. 3, extend completely through the same and which when the section is constructed of solid material, extend partly into the same. In the section 16 near its extreme end is formed an opening 35 slightly larger in diameter than the openings 33 and 34, but which is adapted to register with said last named opening when the section 17 is in its two extreme positions. A leaf spring 36 is attached to the tubular section 16 by means of two rivets 37. This leaf spring has secured to it a lug 38 which is riveted to said leaf spring as indicated at 39. Lug 38 projects through the opening 35 and may be engaged in either of the sockets 33 or 34. The extreme end of the leaf spring 36 is turned upwardly as designated at 41 to form a finger piece by means of which the said leaf spring may be manipulated. In normal position the leaf spring urges the lug 38 into engagement with the respective sockets 33 and 34. When it is desired to disengage the said lug from the sockets, the leaf spring 36 is engaged by the finger piece 41 and raised upwardly sufficiently to permit of sliding the section 17 with respect to the section 16.

The use of the invention is as follows: In normal position the parts are disposed as shown in Fig. 1. When the shovel is desired for use the leaf spring 36 is raised by means of the finger piece 41 and the telescoping section 17 drawn outwardly by means of the hand grip 18. As soon as the section commences to move the spring 36 is released and when the lug 38 engages in the socket 33 the parts become locked and the shovel is ready for use. When it becomes desirable to collapse the shovel, the finger piece is again manipulated to disengage lug 38 from socket 33 and the section 17 moved inwardly until the lug 38 engages the socket 34. In such position the section 17 is again held in proper position. It will be noted that the extreme end of the section 17 is contained within the portion of the tubular section 16 disposed within the scoop of the blade 10 when the shovel is collapsed. By means of this construction, an extremely short collapsed structure is produced since all of the space available is utilized.

In Figs. 4 and 5 I have shown a modification of the invention. In this modification similar parts have been designated by the same reference numerals and the description thereof will not be repeated. In this form of the invention, the section 17 is of an external diameter slightly less than the internal diameter of the section 16 so as to leave a space 42 therebetween. At the extreme end of the section 16 is provided a sleeve 44 which is shown in detail in Fig. 5 and which fits snugly within the said section 16 and provides a bearing for guiding the section 17 for sliding and rotational movement with respect to the section 16. The sleeve 44 is preferably welded or brazed to the section 16, although the same may be riveted thereto if desired. The section 17 is provided at its free end with a collar 45 which is riveted to the said section by means of a rivet 46. This collar and the sleeve 44 guide the section 17 for movement with respect to the section 16.

For the purpose of locking the structure in the position shown in Fig. 4 the section 17 is provided with a lug 47 extending outwardly therefrom. This lug may be formed with a shank 48 which extends through the said section and is riveted thereto as designated at 49. The lug 47 is adapted to pass through a slot 51 in the sleeve 44 extending longitudinally along said sleeve on one side thereof or is adapted to be received in a socket 52 formed at one end of the sleeve on the side thereof opposite the slot 51. When the lug 47 is within the socket 52, the said lug and the section 17 are restrained from rotational movement and from sliding movement into collapsed position. To hold said section from movement in the opposite direction, a screw cap 54 is provided which is internally threaded at 55 to screw upon threads 56 formed on the end of the tubular section 16. This cap is constructed with a bore 57 which snugly receives the telescoping section 17 and which is of the same diameter as the bore of the sleeve 44. When the cap 54 is screwed in position, as shown in Fig. 4, the lug 47 is held lodged within the socket 52 and movement of the telescoping section 17 either longitudinally or rotationally is completely prevented.

It will become apparent that the lug 47 serves merely to hold the handle in extended position. For the purpose of holding the handle in contracted position, a leaf spring 58 is employed which is attached to the telescoping section 17 of the handle and is disposed within the space 42 in the tubular section 16. This leaf spring is attached to the tubular section 17 by means of rivets 59 and frictionally engages the inner surface of the tubular section 16. By means of the friction created by said leaf spring, the handle section 17 is held in retracted position. The leaf spring 58 in addition to holding the parts of the handle in retracted position, serves as a stop for limiting the outward movement of the handle section 17.

The use of the invention shown in Figs. 4 and 5 is as follows: When the shovel is collapsed, section 17 is fully within the section 16. When it is desired to extend the handle, the cap 54 is first removed and moved to a position such as shown in dotted lines at 61 in Fig. 4. The section 17 is then rotated until the lug 47 comes into register with the slot 51. The lug can then be slid through the slot until the same is upon the exterior of the device. The length of the spring 58 is such that ample room is provided to permit of said lug becoming completely free from the tubular section 16. The hand grip 18 is next rotated through an angle of 180 degrees which brings the lug 47 opposite the socket 52 in said lug and in such position may be inserted into said socket. Upon the re-application of the cap 54 the lug 47 is rigidly held within the said socket and section 17 held from movement with respect to section 16. When the parts are so assembled the two sections of the handle are firmly locked together and deprived of either rotational or longitudinal movement.

After the shovel has been erected the same may be used in the ordinary manner without respect to the collapsing feature thereof and due to the design of the shovel the handle is of sufficient length to permit of conveniently manipulating the same.

As previously stated, the invention may be used with other implements as well as shovels, as for example, forks, rakes, or other implements of similar character.

My invention is highly advantageous in that an extremely simple and practical device is provided which may be embodied in a shovel capable of being carried about in an automobile. My invention can be constructed at a nominal cost and the parts are so formed that the same may be readily constructed by machinery ordinarily available for the purpose. Due to the particular feature of connecting the tubular section to the blade of the shovel, the device becomes extremely short and compact when collapsed.

Changes in the specific form of my invention, as herein disclosed, may be made within the scope of what is claimed without departing from the spirit of my invention.

Having described my invention, what I claim as new and desire to protect by Letters Patent is:

1. An implement handle comprising a tubular section attached to the implement, a telescoping section slidable within said tubular section and being of a diameter less than the diameter of said tubular section, a sleeve within said tubular section at the end thereof, said sleeve having a slot extending therethrough on one side and a notch formed on the other side, a lug issuing outwardly from said telescoping section and being adapted to slide through said slot and being adapted to be received within said notch, and a threaded cap adapted to be screwed upon the end of said tubular section, said cap serving to hold said lug within said notch.

2. In a shovel, a blade having a rear flange extending upwardly therefrom, a handle comprising a tubular section and a telescoping section slidable along said tubular section, said flange having an opening therethrough through which said tubular section extends, said tubular section being feathered at its extreme end and attached to said blade upon the face thereof, said telescoping section being adapted to extend into said tubular section for a portion of the length thereof overlying the blade, and means for holding the telescoping section in fixed position with reference to the tubular section.

3. In a shovel, a blade having a rear flange extending upwardly therefrom, a handle comprising a tubular section and a telescoping section slidable along said tubular section, said flange having an opening therethrough through which said tubular section extends, said tubular section being slit at its extreme end and severed portions thereof flattened out to form ears on either side thereof by means of which said tubular section may be attached to the blade of the shovel, said telescoping section being adapted to extend into said tubular section for a portion of the length thereof overlying the blade, and means for holding the telescoping section in fixed position with reference to the tubular section.

4. An implement handle comprising a tubular section attached at one end to the implement, a telescoping section slidable within said tubular section and being of a diameter less than the diameter of said tubular section, a sleeve within said tubular section at the free end thereof and of a length less than the length of said section, said sleeve being attached to said section and snugly receiving said telescoping section, said sleeve having an exposed end and being formed with a slot extending throughout the length thereof and in its exposed end with a notch, a collar secured to the inner end of said telescoping section and snugly fitting within said tubular section, a lug issuing outwardly from the inner end of said telescoping section and being disposed a distance from said collar greater than the length of the sleeve, said lug being adapted to slide through said slot and being adapted to be received within said notch, and a threaded cap adapted to be screwed upon the free end of said tubular section and to cover the exposed end of the sleeve to close said notch and retain the lug within said notch.

5. In a shovel, a blade having a rear flange extending upwardly therefrom, a handle comprising a tubular section and a telescoping section slidable along said tubular section, said flange having an opening therethrough through which said tubular section extends, said tubular section being feathered at its extreme end and attached to said blade upon the face thereof, said telescoping section being adapted to extend into said tubular section for a portion of the length thereof overlying the blade.

6. In a shovel, a blade having a rear flange extending upwardly therefrom, a handle comprising a tubular section and a telescoping section slidable along said tubular section, said flange having an opening therethrough through which said tubular section extends, said tubular section being slit at its extreme end and the severed portions thereof flattened out to form ears on either side thereof by means of which said tubular section may be attached to the blade of the shovel, said telescoping section being adapted to extend into said tubular section for a portion of the length thereof overlying the blade.

JOHN A. McBRADY.